United States Patent
Ahluwalia et al.

(10) Patent No.: US 9,600,620 B2
(45) Date of Patent: Mar. 21, 2017

(54) REPEATER INSERTIONS PROVIDING REDUCED ROUTING PERTURBATION CAUSED BY FLIP-FLOP INSERTIONS

(71) Applicant: Xpliant, San Jose, CA (US)

(72) Inventors: Daman Ahluwalia, Los Gatos, CA (US); Nikhil Jayakumar, San Jose, CA (US)

(73) Assignee: XPLIANT, San Jose, CA (US)

( * ) Notice: Subject to any disclaimer, the term of this patent is extended or adjusted under 35 U.S.C. 154(b) by 87 days.

(21) Appl. No.: 14/664,680

(22) Filed: Mar. 20, 2015

(65) Prior Publication Data

US 2016/0275230 A1 Sep. 22, 2016

(51) Int. Cl.
  *G06F 17/50* (2006.01)
(52) U.S. Cl.
  CPC ...... *G06F 17/5077* (2013.01); *G06F 17/5054* (2013.01)
(58) Field of Classification Search
  USPC .......................................................... 716/128
  See application file for complete search history.

(56) References Cited

U.S. PATENT DOCUMENTS

| | | | |
|---|---|---|---|
| 6,765,413 B2 * | 7/2004 | Nakase | G11O 5/063 326/30 |
| 2004/0255256 A1 * | 12/2004 | Kim | G06F 17/5072 716/114 |
| 2008/0059933 A1 * | 3/2008 | Barke | G06F 17/5045 716/114 |
| 2014/0317462 A1 * | 10/2014 | Harris | G01R 31/318552 714/726 |

OTHER PUBLICATIONS

Aki et al., "Reducing Interconnect Delay Uncertainty via Hybrid Polarity Repeater Insertion", Jul. 25, 2008, IEEE Transactions on Very Large Scale Integration (VLSI) Systems (vol. 16, Issue: 9, Sep. 2008), pp. 1230-1239.*

* cited by examiner

*Primary Examiner* — Bryce Aisaka (57) ABSTRACT

System and method of automatically performing repeater insertions in physical design of an integrated circuit. Repeaters are inserted in interconnects in a staggered fashion and spaced apart to accommodate potential flip-flop insertions. The sufficient spacing between the repeaters in combination with the staggered pattern ensures that flip-flop insertions can be performed at any of the repeater locations without space limitation. When rerouting is needed following a flip-flop insertion on an interconnect, automatic rerouting is performed but restricted to a short and specified region along the interconnect. Thereby, the resulted alteration from the current routing configuration is minimal and deterministic.

17 Claims, 5 Drawing Sheets

REPEATER INSERTIONS PROVIDING REDUCED ROUTING PERTURBATION CAUSED BY FLIP-FLOP INSERTIONS

TECHNICAL FIELD

The present invention is related to the field of integrated circuit design. In particular, the present invention is related to repeater insertions in physical design.

BACKGROUND

Interconnect optimization is a critical component of circuit design, and in particular, of Very Large Scale Integration (VLSI) circuit design. As part of interconnect optimization of a VLSI circuit design, repeaters (e.g., buffers and inverters) are used to reduce interconnect delay and to meet transition time/noise constraints. An automatic repeaters insertion process is typically used to position repeater elements at selected locations along the interconnects. However, merely using repeaters does not solve all timing requirements; for example, when signal propagation is greater than a clock cycle, the mere addition of repeaters may not solve the timing constraints and the insertion of flip-flops/latches is essential.

As a VLSI circuit is usually deeply pipelined and so the number of flip-flops in the circuit is significant, a design automation software tool is used to insert flip-flops into the circuit design to reduce the Register-Transfer-Level (RTL)-to-layout convergence time. Typically, the RTL specification determines the number of clock cycles required for each sender-receiver path in the design. When data from the sender logic requires more than one clock cycle to reach the receiver logic, a flip-flop is added to the RTL specification of the circuit design. Adding a flip-flop can be performed by replacing a repeater or adding a flip-flop in a new location along the path.

Typically, the size of a flip-flop is up to three times of a repeater element. As the sizes of IC device continue to shrink and the wire spacings become increasingly narrower, replacing closely-spaced repeaters on the wires with much larger flip-flops may cause overlap between the flip-flops. Unfortunately, conventional placement and routing processes identify locations for repeater insertions without accounting for the size difference between a flip-flop and a repeater element. For example, there can be a lack of space for replacing adjacent repeaters with flip-flops, which may force a circuit designer to manually reposition them for each path or even remove them entirely.

Sometimes, it is difficult to identify locations for flip-flop insertions which satisfy both the timing requirements and the space limitation. Moreover, relocating flip-flops likely disturbs the routing configuration substantially, including the routes that are manually laid-out. These issues inevitably and undesirably prolong RTL-layout convergence time.

SUMMARY OF THE INVENTION

Therefore, it would be advantageous to provide a repeater placement mechanism offering reduced perturbation on the routing following flip-flop insertions.

According to embodiments of the present disclosure, provided with a routing configuration of an integrated circuit (IC) design, repeaters are disposed in the interconnects in a staggered fashion and positioned apart from each other in adequate spacing for potential flip-flop insertions. Thus, any repeater inserted in such interconnects can be replaced with a flip-flop in a subsequent flip-flop insertion process. Particularly, the interconnects may correspond to parallel critical paths located in the same metal layer and configured for perpendicular signals in a repeater tube. The staggered distribution of repeaters eliminates the space limitation on subsequent flip-flop insertions and significantly reduces the potential need for repositioning flip-flops.

Further, according to embodiments of the present disclosure, if a flip-flop insertion dictates rerouting an interconnect (e.g., a lateral interconnect in a repeater tube), automatic rerouting is restricted to a short and specified distance of the interconnect and thus is deterministic. Specifically, two end points along the interconnect can be specified to define a short region for automatic rerouting, while the routing of the rest of the interconnect can be advantageously retained. With the routing configuration mostly preserved, the RTL-physical layout convergence time is advantageously shortened.

According to one embodiment of the present disclosure, a method of placing repeaters in interconnects in physical design of an integrated circuit (IC) includes: accessing a first routing configuration of the interconnects of the IC; and determining locations in the interconnects for inserting a plurality of repeaters according to timing requirements. The plurality of repeaters are inserted at determined locations, wherein repeaters in adjacent interconnects are disposed in a staggered pattern.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated, otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Overall, embodiments of the present disclosure utilize a repeater insertion process during placement and routing, where repeaters are inserted in interconnects in a staggered fashion and spaced apart to accommodate potential flip-flop insertions. Thus, even though each flip-flop occupies a greater fabrication dimension than a repeater element, the sufficient spacing between the repeaters in combination with the staggered pattern ensures that flip-flop insertions can be performed at any of the repeater locations. This mitigates or eliminates the need to relocate a flip-flop due to space limitation, leading to significantly reduced routing perturbation resulted from flip-flop insertions. When rerouting is needed following a flip-flop insertion on an interconnect, automatic rerouting is performed but restricted to a short and specified region along the interconnect. Thereby, the resulted alteration from the current routing configuration is minimal and deterministic.

Herein, unless specified otherwise, the term of "repeater" refers to inverter or a buffer; and the term of "flip-flop insertion" refers to the operation of adding a flip-flop on an interconnect or replacing a repeater on the interconnect with a flip-flop.

Figure 1:
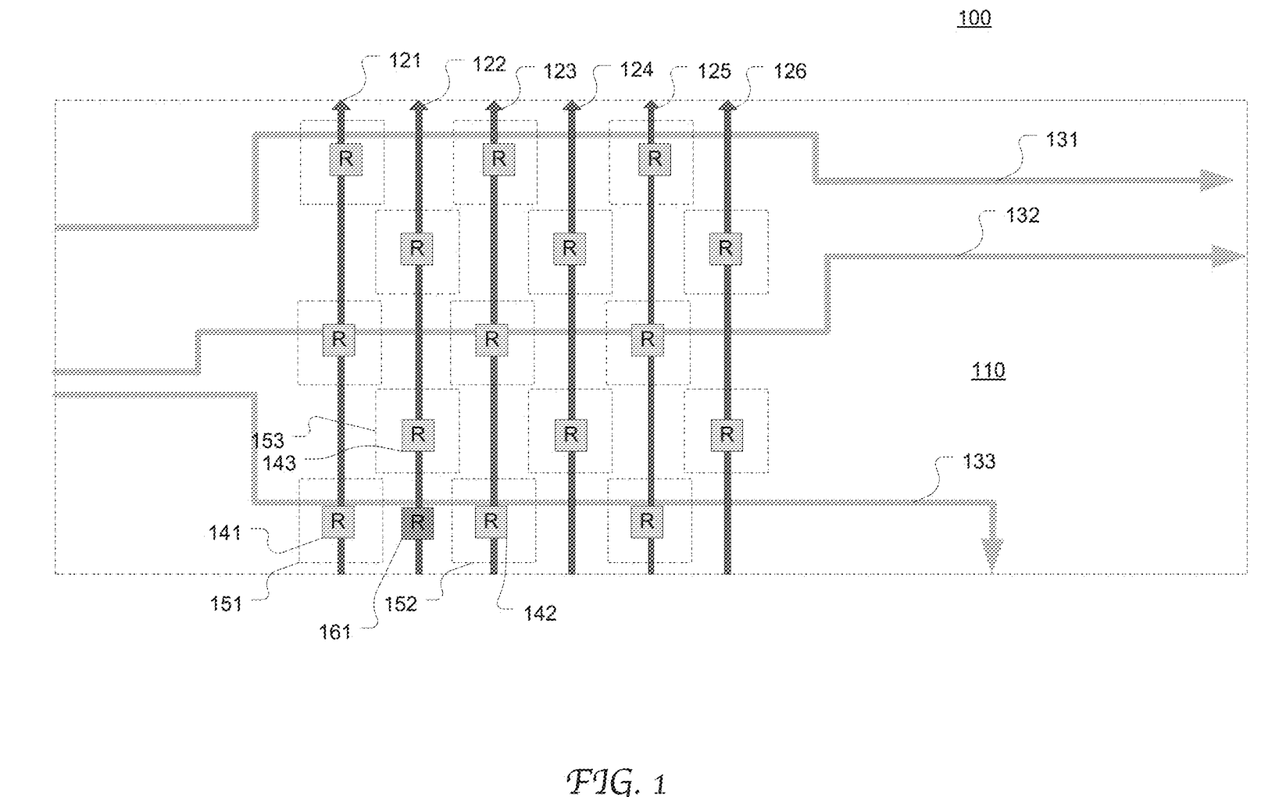
FIG. 1 illustrates an exemplary placement distribution of repeaters in interconnects for perpendicular signals in a repeater tube of an integrated circuit according to an embodiment of the present disclosure.

FIG. 1 illustrates an exemplary placement distribution of repeaters in interconnects for perpendicular signals in a repeater tube 110 of an integrated circuit according to an embodiment of the present disclosure. The integrated circuit may be an application-specific integrated circuit (ASIC), Silicon-on-Chip (SoC), or a field-programmable gate array (FPGA), etc.

The repeater tube 110 is a routing region between logic blocks (not shown). Loosely speaking, there are two types of signals that flow through the repeater tube, perpendicular signals and lateral signals (or so-called "along" signals). The paths for perpendicular signals (e.g., 121-125) are timing and slew critical. The pins or ports associated with these paths are aligned with minimum interconnect length in between. The perpendicular paths (e.g., 121-125) are disposed in the same metal layer and their routing configuration is determined according to a Steiner routing process. Also included in the repeater tube 110 are paths for lateral signals (e.g., 131-133) that are not timing critical but slew critical, e.g., power and/or clock signals. The pins and ports are not aligned, and the paths (e.g., 131-133) may traverse in relatively long distances and across multiple metal layers and different edges of the repeater tube.

In the illustrated example, a physical layout with the routing configuration (including the paths 121-125 and 131-133) is resulted from synthesis of a logic design through partitioning, floor-planning, placement, etc. Based on the timing parameters of each path (e.g., the wire length), repeaters are strategically inserted to speed up signal propagation and thereby achieve desired propagation delay of the path. As described in greater detail below, in a subsequent flip-flop insertion process, a repeater element may be replaced by a flip-flop which occupies a much larger fabrication dimension than the repeater.

If a number of repeaters are placed too close to each other as would be implemented according to a repeater insertion process in the prior art, some of them may not be appropriate for conversion to a flip-flop due to the space limitation, and particularly due to the narrow gaps between the paths. For instance, the repeaters 141, 161 and 142 are placed side by side on the adjacent paths 121, 122 and 123. In the scenario that three repeaters 141, 161 and 142 are all selected for conversion to flip-flops based on the timing parameters of the paths 121, 122 and 123, there can only fit two flip-flops (e.g., 151 and 152). A designer may need to manually find a suitable location for the third flip-flop insertion, which may cause a chain of undesired changes in the given physical layout.

In a repeater insertion process according to the present disclosure, the repeaters are adequately spaced apart along the paths in anticipation of potential flip-flop replacement. Particularly, repeaters are placed in a staggered fashion where two adjacent repeaters (e.g., 141 and 143) in adjacent paths are offset from each other by at least the size of a flip-flop. In this manner both repeaters can be replaced with flip-flops (151 and 153) without interference. Thus, the staggered pattern of repeaters significantly reduces the need for repositioning flip-flops due to the space limitation that would be imposed by a repeater pattern in the prior art.

It will be appreciated that the present disclosure is not limited to any specific staggered pattern of placing repeaters. The offset distances between adjacent repeaters of adjacent paths may be the same or different so long as they do not impose a potential space limitation for any repeater to be replaced by a flip-flop.

In some embodiments, a staggered repeater pattern is applied on a plurality of perpendicular paths of the same metal layer of a repeater tube, which are relative short and timing critical. However, it will also be appreciated that repeaters can be arranged in a staggered pattern in any suitable routing configuration or design.

Figure 2:
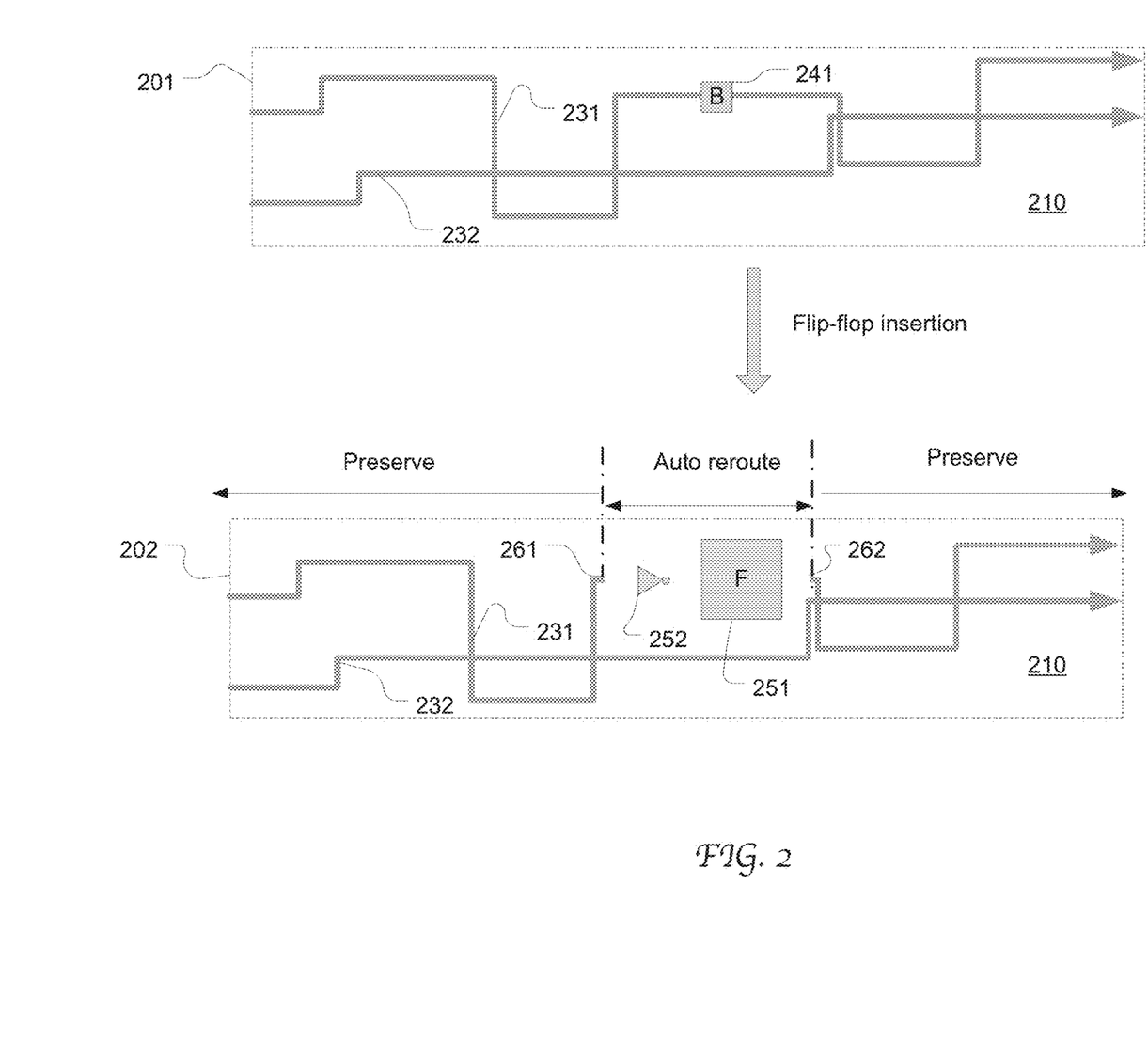
FIG. 2 illustrates an exemplary method of preserving routing of a long path following a flip-flop insertion according to the present disclosure.

Generally speaking, routing a long path (e.g., the lateral path 131-133) can be complicated and typically involves a combination of automatic and manual routing processes. With respect to a path that traverses a long distance and possibly multiple metal layers, it is highly desirable that its routing is not altered due to repeater insertion or flip-flop insertion processes. FIG. 2 illustrates an exemplary method of preserving routing of a long path following a flip-flop insertion according to the present disclosure.

The diagram 201 shows two lateral paths 231 and 232 in a repeater tube 201. The paths 231 and 232 may correspond to clock lines or power lines, for example. A buffer 241 is placed in the path 231 during a repeater insertion process. In a flip-flop insertion process, it is determined whether to replace the buffer 241 with an inverter 251 and a flip-flop 251 coupled in series, which would dictate rerouting of the path 231. Conventionally, rerouting is automatically performed over the entire path 231, which likely produces a substantially different routing configuration of the path 231 and further affects the routing of other paths (e.g., path 232) in an unpredictable way.

According to embodiments of the present disclosure, if a flip-flop insertion calls for rerouting of a path, automatic rerouting is constrained to a short and specified region and thus is relatively deterministic. More specifically, two cut-off points along the path can be specified to define a short region for automatic rerouting, while the routing of the rest of the path remains unchanged.

As shown in diagram 202, once the inverters 252 and flip-flop 251 are placed on the path 231, a point 261 proximate to the input of the inverter 251 and a point 262 proximate to the output of the flip-flop 251 are determined, either automatically or manually. An automatic rerouting process is then performed to determine the routing for the region between the points 261 and 262, while the rest of the path is preserved. The resulted modification on the path is insubstantial and relatively deterministic due to the short and known distance between the 261 and 262, as opposed to the modification resulted from rerouting the entire path in the prior art. Therefore, the currently routing configuration is largely preserved, which advantageously shortens the RTL-physical layout convergence time.

Figure 3:
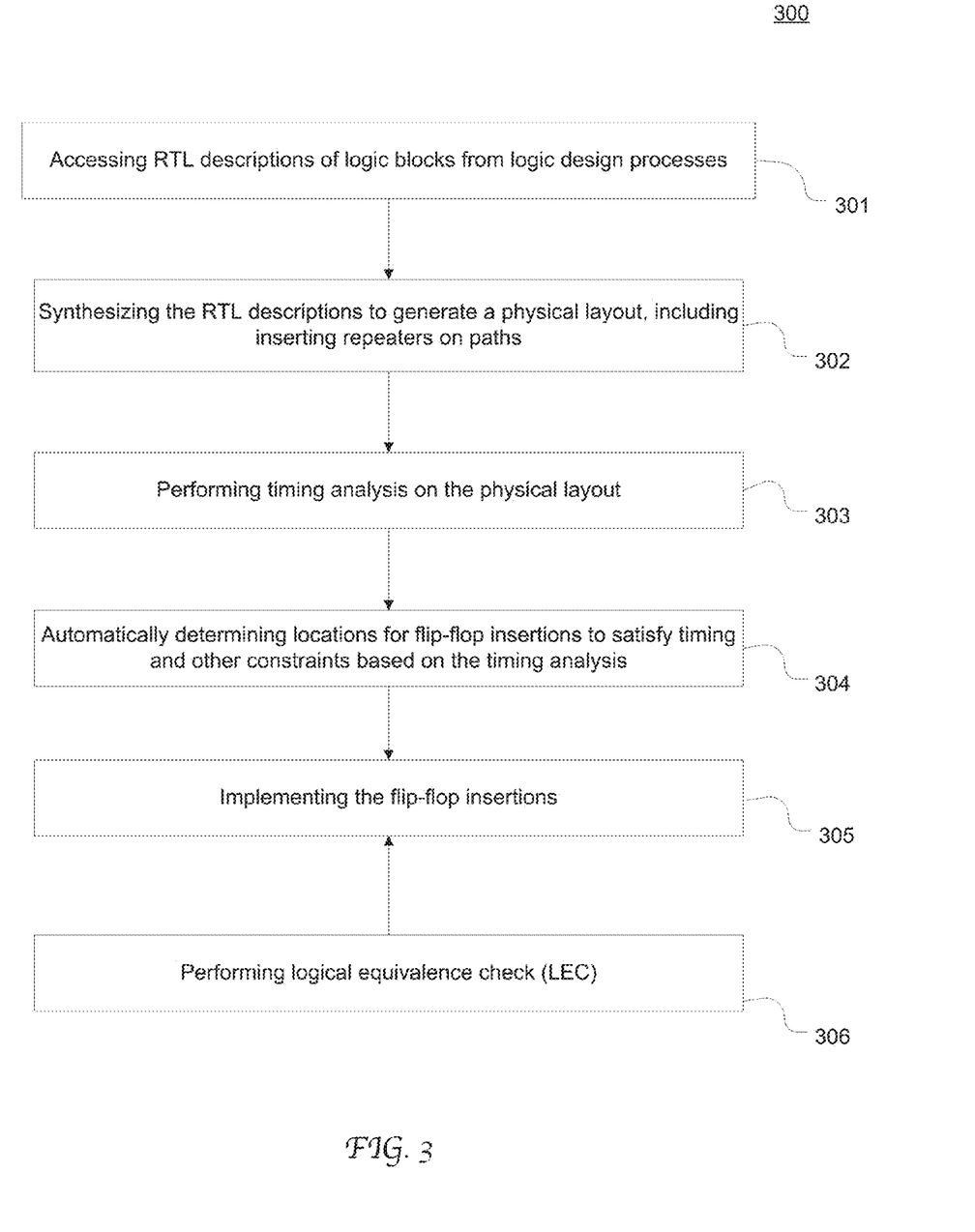
FIG. 3 is a flow chart depicting an exemplary method of performing flip-flop insertions in the physical design of an integrated circuit according to an embodiment of the present disclosure.

FIG. 3 is a flow chart depicting an exemplary method 300 of performing flip-flop insertions in the physical design of an integrated circuit according to an embodiment of the present disclosure. The integrated circuit may be an ASIC, SoC, or a field-programmable gate array (FPGA), etc. Method 300 may be performed by one or more design automation software programs or scripts, etc.

At 301, following the logic design, the RTL descriptions of the integrated circuit are accessed. Based on the estimated timing (e.g., estimated line distances and clock period) from the logic design, the RTL design yields an estimated count limit for flip-flop insertions for each logic interface, where each interface includes a plurality of nets. At 302, the RTL descriptions are synthesized as a physical layout through the processes of partitioning, floor-planning, placement, clock tree analysis, signal routing, etc.

During the synthesis and provided with the physical layout including the routing configuration, repeaters are inserted on the nets based on the lengths of the nets and the desired signal transition times. According to the present disclosure, the repeaters on adjacent nets are placed in a staggered manner and spaced apart such that any repeater can be replaced with a flip-flop without space limitation. Depending on the various embodiments, the staggered pattern may be applied to selected nets that are closely spaced.

At 303, a timing analysis is performed on the physical implementation of the integrated circuit, which generates a timing report. The timing report provides information regarding timing violations and propagation delay along each net.

At 304, the timing report is automatically analyzed against a set of constraints for flip-flop insertions to determine the legal locations for flip-flop insertions. More specifically, the timing report produces the candidate locations for each net to satisfy timing requirements. The logic design also imposes constraints with respect to flip-flop insertions in addition to the timing requirements. Thus, certain types of locations are treated as ineligible for flip-flop insertions and are automatically flagged as illegal for subsequent insertion operations.

In some embodiments, the RTL design estimates a maximum count for flip-flop insertions in each net of a logic interface. The estimated maximum count is used as an upper limit (or the RTL count limit) in the insertion determinations during the physical design. Particularly, based on the timing requirements and the location constraints, if the actually needed count for a net in the physical implementation exceeds its RTL count limit, the net is automatically adjusted to reduce the actually needed count without changing the routing significantly.

In some embodiments, selected timing-related net variables and/or the timing budget can be incrementally varied until the actually needed count falls under the RTL count limit. For example, to speed up signal transmission, the clock-to-Q time and clock skew can be changed, and a standard cell can be replaced with the faster one. The clock period can be varied to allow more timing budget. Various other suitable measures that are well known in the art may also be performed to decrease the need for flip-flop insertions without changing routing.

The net is iteratively modified and/or the buffers and inverters are appropriately sized and/or swapped with higher speed versions and timing-analyzed until the timing requirements are satisfied by inserting flip-flops at a number not exceeding the count limit. In this manner, the timing requirement from the logic design can be advantageously satisfied while avoiding the need for significantly changing routing or layout implementation.

At 305, flip-flop insertions are implemented at the identified locations which are typically repeater stations or cells. Each identified location is automatically associated with an operation of either adding a new flip-flop or replacing a repeater with a flip-flop. For example, if a cell is an inverter, a new flip-flop is inserted. If a cell is a large buffer, a flip-flop is inserted before the buffer. If a cell is a buffer that is small enough, the cell is replaced with a flip-flop. If there is a reverse conversion (flop to buffer/inverter), the flip-flop is removed from scan and its clock is disconnected. In some embodiments, the flip-flop insertions are automatically implemented as an engineering change order (ECO) in a placement and routing (P&R) software tool.

If rerouting is needed after a flip-flop insertion, automatic rerouting is constrained to a short and specified net region to avoid unnecessary and substantial modification of the net layout, as described in greater detail with reference to FIG. 2. This further contributes to the preservation of the current routing and layout implementation. In one embodiment, a verification process is performed to ensure that the displacements of the routing and the wire length changes are within targeted limits and so the existing routing configuration is primarily preserved. Clock and scan chains are then connected to the existing clock trees and scan chains. The size of the clock tree is adjusted to fix slew and clock slew.

At 306, after flip-flop insertions, logical equivalence check (LEC) is performed to verify the physical implementation, e.g., to ensure that the wire length deviations are within limits. In one embodiment, the modified implementation may be subject to another timing analysis to ensure an even number of inversions between flip-flops. More specifically, the resulted timing report is automatically parsed. If there is a stage with an odd number of inversions, an inverter is inserted before the flip-flop and one after it. Alternatively, the inverter is replaced before and after the flop with a buffer.

In another embodiment, the LEC incorporates the criteria of inversions across flip-flop boundaries. All the flip-flops are changed back to buffers in the netlist to check the equivalency. The foregoing steps 301-306 are repeated for each round of RTL-to-layout synthesis.

Figure 4:
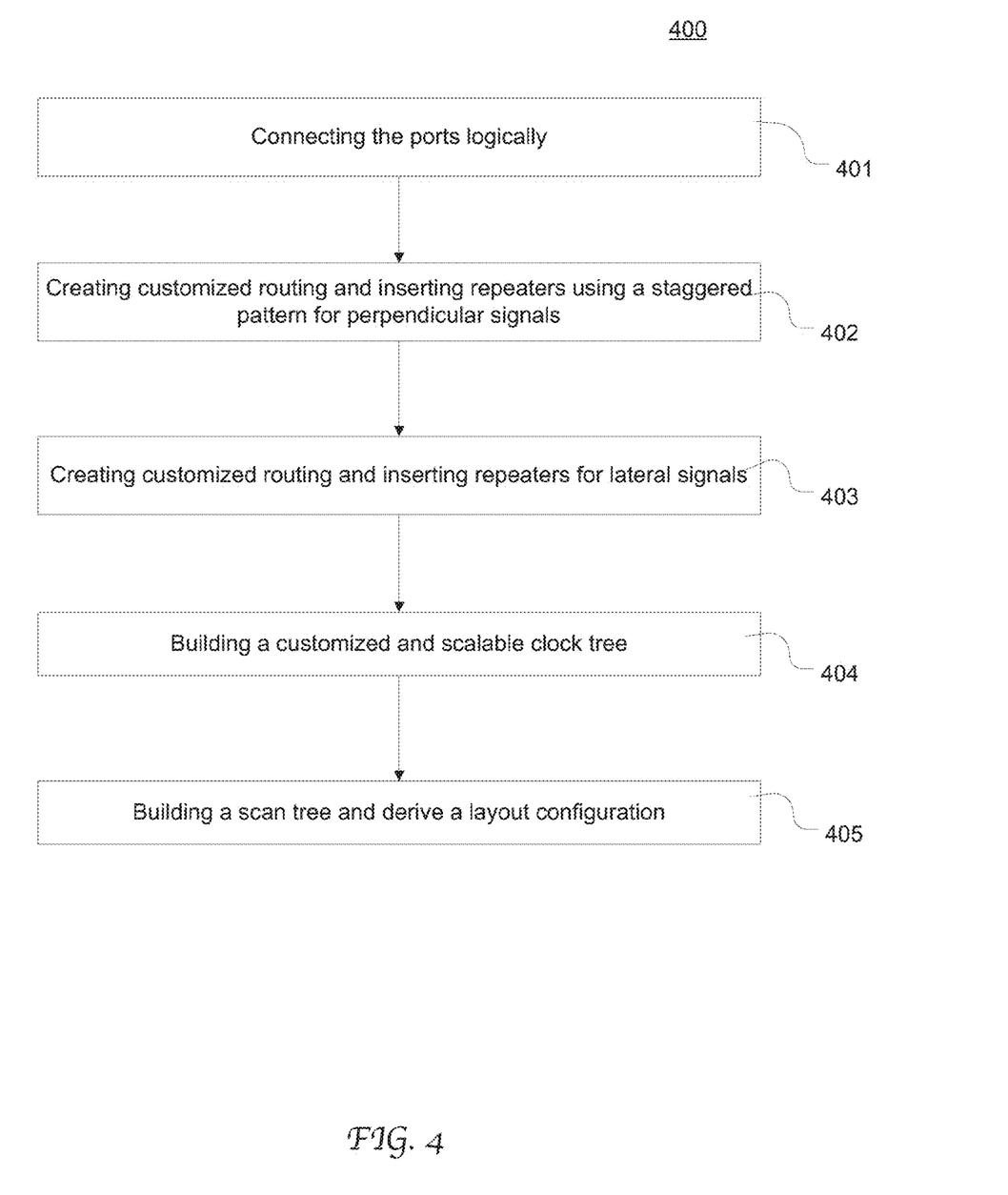
FIG. 4 is a flow chart depicting an exemplary computer implemented process 400 of repeater insertions in physical design in accordance with an embodiment of the present disclosure.

FIG. 4 is a flow chart depicting an exemplary computer implemented process 400 of repeater insertions in physical design in accordance with an embodiment of the present disclosure. Process 400 may be implemented as a software program or script having an interface with a timing analysis tool. At 401, a logic design is synthesized into a physical layout including function logic blocks and interfaces between them, each interface including a plurality of nets. The ports of the logic blocks are connected logically via the nets.

At 402, with respect to the perpendicular signals that are timing critical with aligned input/output pins (as shown in FIG. 1), a customized routing configuration is generated and repeaters are inserted along the nets based on the timing parameters. According to the present disclosure, the repeaters are placed in a staggered pattern and spaced apart along the nets. Each repeater element on a net is assigned with a space that is equal to or greater than a flip-flop that potentially replaces the repeater in a subsequent flip-flop insertion process, as described in greater detail above. When the routing for the perpendicular signals is finished, the routing lengths are verified to ensure they are within a tolerance range.

At 403, with respect to the lateral signals, a placement and routing is performed to determine a routing configuration and repeaters on the routes. Typically, a tighter slew target value is used to ensure the post-routing slews are within targeted ranges. The layout core area is divided into 50×50 boxes and five dummy flip-flops, one in the center and four in the corners.

At 404, a customized and scalable clock tree is configured and connected to the dummy flip-flops. As such, a clock signal is derived from the clock tree and coupled to the repeaters. Repeaters are converted to flops with tap-off from this customized clock tree using spatial proximity algorithms. At 405, a scan tree is configured, and the complete physical layout is released for full-chip timing analysis.

Figure 5:
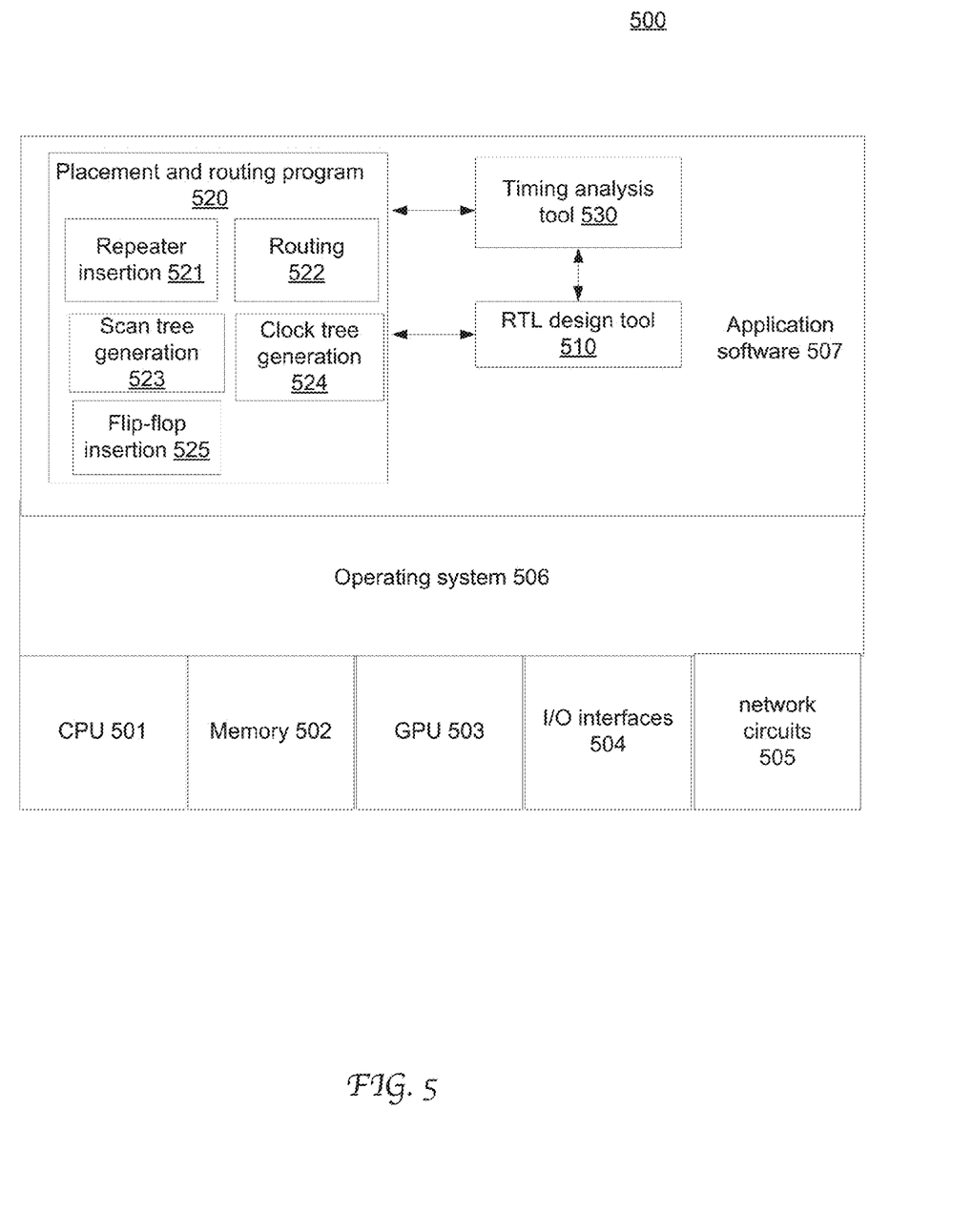
FIG. 5 illustrates a computing system configured to perform automated repeater insertions and flip-flop insertions in accordance with an embodiment of the present disclosure.

FIG. 5 illustrates a computing system 500 configured to perform automated repeater insertions and flip-flop insertions in accordance with an embodiment of the present disclosure. The computing system 500 includes a processor 501, system memory 502, a graphics processing unit (GPU) 503, I/O interfaces 504 and network circuits 505, an operating system 506 and application software 507 stored in the memory 502. The software 507 includes the RTL design tool 510, the placement and routing program 520, and the timing analysis tool 530. The computing system 500 may be part of a server system configured for design automation.

When incorporating the user's function specifications for an integrated circuit and executed by the CPU 501, the RTL design tool 510 generates RTL descriptions of the logic blocks. The RTL descriptions are converted to gate-level descriptions of the circuit through a logic synthesis tool. The synthesis results are then used by placement and routing program 520 to create a physical layout. A list of nets is derived from the physical layout. The nets are analyzed by the timing analysis tool 530 which outputs a timing report. A maximum count for flip-flop insertions is estimated for each net of an interface to satisfy the latency requirements based on the RTL design.

The placement and routing program may need to adjust the physical layout based on the timing analysis results. A physical layout may be finalized after a plurality of cycles of placement and routing—timing analysis processes.

The placement and routing program 520 includes a repeater insertion module 521, a routing module 522, a scan tree generation module 523, a clock tree generation module 524 and a flip-flop insertion module 525. The routing module 522 is configured to automatically determine the routes connecting the logic blocks. In particular, if a flip-flop insertion dictates rerouting, the routing module 522 can automatically reroute only a selected portion of a path while the previously-determined routing of remaining portion is preserved, as described in greater detail with reference to FIG. 2.

The repeater placement module 521 inserts repeaters on the paths. Particularly, with respect to perpendicular paths, the repeaters are arranged in a staggered pattern and the spacing among them is dependent on the size of the flip-flop cell, as described in greater detail with reference to FIGS. 1-3. It will be appreciated that the locations selected for repeaters also satisfy various other criteria or constraints that are well known in the art, e.g., the timing constraints. The scan tree generation module 523 generates scan trees used for scan testing. The clock tree generation module generates a clock tree that provides clock signals to various components of the integrated circuit.

The flip-flop insertion module 525 determines the flip-flop counts that are needed based on the physical layout and compares it with the RTL count limit for each net. If the needed count is equal to the count limit, flip-flop insertions are performed. If the needed count is greater than the count limit, timing-related variables are adjusted to decrease the propagation delay of the net or to allow more timing budget, e.g., by iteratively altering the clock period, clock-to-Q delay, standard cell or metal material, etc. If all the nets of the interface need fewer insertion count than the count limit, this information is fed back to update the RTL design.

The placement and routing program 520 is configured to perform other functions as described in greater detail with reference to FIGS. 1-4, and may further include various other components and functions that are well known in the art. As will be appreciated by those with ordinary skill in the art, the placement and routing program 520 can be implemented in any one or more suitable programming languages that are known to those skilled in the art, such as C, C++, Java, Python, Perl, TCL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the disclosure shall be limited only to the extent required by the appended claims and the rules and principles of applicable law. Any claimed embodiment of the invention does not necessarily include all of the objects or embodiments of the disclosure

What is claimed is:

1. A method of placing repeaters in interconnects in physical design of an integrated circuit, said method comprising:
   accessing a first routing configuration of said interconnects of said integrated circuit;
   determining locations in said interconnects for inserting a plurality of repeaters according to timing requirements; and
   inserting said plurality of repeaters at determined locations, wherein repeaters in adjacent interconnects are disposed in a staggered pattern, and wherein further disposing said plurality of repeaters in said staggered pattern comprises disposing two adjacent repeaters of said repeaters in said adjacent interconnects at an offset from each other, said offset being at least a size of a standard flip-flop.

2. The method of claim 1 further comprising:
   outputting a physical layout of said integrated circuit, wherein said physical layout comprises said interconnects and said plurality of repeaters;
   performing timing analysis on said physical layout;
   identifying a set of repeaters from said plurality of repeaters for conversion to flip-flops based on said timing analysis; and
   subsequent to said conversion, generating a second routing configuration of said interconnects,
   wherein said staggered pattern causes said second routing configuration to be substantially same as said first routing configuration.

3. The method of claim 2 further comprising performing scan tree insertions prior to said generating said second routing configuration.

4. The method of claim 2, wherein said second routing configuration substantially preserves routing in relatively long-length interconnects that are defined in said first routing configuration.

5. The method of claim 2, wherein said plurality of repeaters comprise inverters and buffers.

6. The method of claim 5,
   wherein said inserting said plurality of repeaters comprises:
      inserting an inverter in an interconnect of said interconnects; and
      inserting a buffer in said interconnect and adjacent to said inverter, and
   wherein said generating said second routing configuration comprises automatically determining routing of a select portion of said interconnect while preserving routing of a remaining portion of said interconnect, wherein said select portion includes said inverter and said buffer.

7. The method of claim 1, wherein said interconnects are parallel to each other and disposed in a same metal layer.

8. A computer implemented method comprising:
   accessing a first routing configuration of interconnects between logic blocks of an integrated circuit;
   determining locations in said interconnects for inserting a plurality of repeaters according to timing requirements for signal propagation;
   inserting said plurality of repeaters at determined locations, wherein repeaters in adjacent interconnects are disposed in a staggered pattern, further wherein disposing said repeaters in said staggered pattern comprises disposing two adjacent repeaters of said repeaters in said adjacent interconnects at an offset from each other, said offset being at least a size of a standard flip-flop; and
   generating a physical layout of said integrated circuit based on said first routing configuration and said inserting;
   performing timing analysis on said physical layout;
   substituting selected repeaters from said plurality of repeaters with flip-flops based on said timing analysis; and
   generating a second routing configuration of said interconnects based on said substituting, wherein said staggered pattern causes said second routing configuration to substantially preserve routing in relatively long-length interconnects that are defined in said first routing configuration.

9. The computer implemented method of claim 8, wherein said plurality of repeaters comprises inverters and buffers.

10. The computer implemented method of claim 9,
    wherein said inserting said plurality of repeaters comprises:
       inserting an inverter in an interconnect of said interconnects; and
       inserting a buffer in said interconnect and adjacent to said inverter, and
    wherein said generating said second routing configuration comprises automatically determining routing of a select portion of said interconnect while preserving routing of a remaining portion of said interconnect, wherein said select portion comprises said inverter and said buffer.

11. The computer implemented method of claim 8, wherein said interconnects are encompassed in a repeater tube.

12. The computer implemented method of claim 8 further comprising performing scan chain insertions prior to said generating said second routing configuration.

13. A system comprising:
    a processor;
    memory coupled to said processor and comprising instructions that, when executed by said processor, cause the system to perform a method of inserting repeaters in interconnects in physical design of an integrated circuit, said method comprising:
       accessing a first routing configuration of said interconnects of said integrated circuit;
       determining locations in said interconnects for inserting a plurality of repeaters according to timing requirements; and
       inserting said plurality of repeaters at determined locations, wherein repeaters in adjacent interconnects are disposed in a staggered pattern, and wherein further disposing said plurality of repeaters in said staggered pattern comprises disposing two adjacent repeaters of said repeaters in said adjacent interconnects at an offset from each other, said offset being at least a size of a standard flip-flop.

14. The system of claim 13, wherein said method further comprises:
    outputting a physical layout of said integrated circuit, wherein said physical layout comprises said interconnects and said plurality of repeaters;
    performing timing analysis on said physical layout;
    identifying a set of repeaters from said plurality of repeaters for conversion to flip-flops based on said timing analysis; and
    subsequent to said conversion, generating a second routing configuration of said interconnects, wherein said staggered pattern causes said second routing configuration to be substantially same as said first routing configuration.

15. The system of claim 14, wherein said second routing configuration substantially preserves routing in relatively long-length interconnects that are defined in said first routing configuration.

16. The system of claim 13, wherein said method further comprises performing scan insertions prior to said generating said second routing configuration.

17. The system of claim 13,
wherein said inserting said plurality of repeaters comprises:
inserting an inverter in an interconnect of said interconnects; and
inserting a buffer in said interconnect and adjacent to said inverter, and
wherein said generating said second routing configuration comprises automatically determining routing of a portion of said interconnect while preserving routing of a remaining portion of said interconnect, wherein said portion comprises said inverter and said buffer.

\* \* \* \* \*